United States Patent

[11] 3,627,728

| [72] | Inventors | Antonio H. Fernandes<br>Newark;<br>Charles E. McCormack, Wilmington, both of Del. |
|---|---|---|
| [21] | Appl. No. | 781,262 |
| [22] | Filed | Dec. 4, 1968 |
| [45] | Patented | Dec. 14, 1971 |
| [73] | Assignee | E. I. du Pont de Nemours and Company<br>Wilmington, Del. |

[54] DIARYL-P-PHENYLENEDIAMINE STABILIZERS FOR PEROXIDE-CURED POLYETHYLENE
1 Claim, No Drawings

[52] U.S. Cl. .................................................. 260/45.9 R,
260/41 R, 260/94.9 GA
[51] Int. Cl. ........................................................ C08f 27/00,
C08f 27/22, C08f 45/60
[50] Field of Search ............................................ 260/45.9

[56] References Cited
UNITED STATES PATENTS

| 3,238,176 | 3/1966 | Brooks et al. | 260/45.8 |
| 3,247,161 | 4/1966 | Cox | 260/45.9 |
| 3,296,189 | 1/1967 | Eastman | 260/45.8 |
| 3,432,460 | 3/1969 | Spacht | 260/45.9 |
| 3,507,826 | 4/1970 | Lal et al. | 260/45.9 |
| 3,513,124 | 5/1970 | Kalil | 260/45.9 |

*Primary Examiner*—Donald E. Czaja
*Assistant Examiner*—R. A. White
*Attorney*—Fred C. Carlson

ABSTRACT: In a process for producing cross-linked polyethylene by (1) mixing polyethylene with 1 to 10 parts of a tertiary organic peroxide and (2) heating the mixture to effect cross-linking, the improvement of adding to the mixture before the cross-linking step about from 0.25 to 2 parts of a stabilizer which is an N,N'-diaryl-p-phenylenediamine, all parts being by weight per 100 parts of polyethylene. A preferred diamine stabilizer weightper is that prepared by condensing 1 mole of hydroquinone with at least 2 moles of an amine mixture consisting of 75 to 90 percent by weight of o-toluidine and 25 to 10 percent by weight of technical mixed xylidines.

DIARYL-P-PHENYLENEDIAMINE STABILIZERS FOR PEROXIDE-CURED POLYETHYLENE

BACKGROUND OF THE INVENTION

It is known that peroxide vulcanized or cross-linked polyethylene possesses properties such as temperature stability, solvent resistance, and tensile strength which enable it to be used in many applications where thermoplastic polyethylene would be unsatisfactory. Extreme care must be exercised in compounding the composition, however, to avoid excess peroxide, since the same properties which make peroxides cross-linking agents will bring about oxidative deterioration in the final product.

While it might appear that the solution to the problem of peroxidative deterioration would be the addition of antioxidants such as those developed in rubber technology, it must be remembered that antioxidants are substances which will selectively combine with oxygen, thereby converting oxygen from a state in which it can promote oxidation of an important component of a composition to one in which it combines with a minor component which holds it in a state where it can do no further harm. It would be predicted that antioxidants would combine with tertiary peroxides or decomposition products thereof to cancel out both the cross-linking activity of the peroxide and the antioxidant activity, and experience has shown that this is what happens in the case of most antioxidants. The foregoing is pointed out in U.S. Pat. No. 3,296,189, issued Jan. 3, 1967, to Warren O. Eastman and polymers of 1,2dihydroquinolines, particularly polymers of 1,2-dihydro-2,2,4-trimethylquinoline are disclosed as compounds which will act as antioxidants for peroxide cross-linked polyethylene without significantly interfering with the cross-linking activity of the peroxide. No suggestion is made of any other type of compound which could perform this unique function.

Certain amine-type antioxidants have been proposed as regulators for peroxide-curing of polyethylene in U.S. Pat. No. 3,335,124, issued Aug. 8, 1961 to Hans R. Larsen. The compound N,N'-diphenylethylenediamine is an example of an antioxidant of this type, but again the action of the antioxidant appears to be limited to the particular compositions disclosed and there is no suggestion that a phenylene group could be substituted for the ethylene group.

SUMMARY

Now according to the present invention it has been found that diaryl-p-phenylenediamines can be used as stabilizers in the cross-linking of polyethylene with peroxides. More particularly, the invention provides curable compositions of matter comprising normally solid polyethylene and, based on the weight of the polyethylene, about from 1 to 10 percent of a tertiary organic peroxide which substantially decomposes above about 130° C. and from 0.25 to 2 percent of a diaryl-p-phenylenediamine.

A suitable diamine can advantageously be prepared by condensing 1 mole of hydroquinone with at least 2 moles of an amine mixture consisting of 75 to 90 percent by weight of o-toluidine and 25 to 10 percent by weight of technical mixed xylidines.

DESCRIPTION OF THE PREFERRED EMBODIMENTS

The polyethylene used in the present invention can be made by a well-known high-pressure process or by the lower pressure catalytic process. In addition to the polyethylene other components can be present. Conventional fillers such as silica, carbon black, alumina and calcium silicate can be used in the usual amounts. The polyethylene can be copolymerized with other polymerizable materials such as propylene, ethyl acrylate, vinyl acetate and butylene. The copolymer materials can comprise from 1 to more that 50 percent by weight of the polyethylene. Mixtures of polyethylene with other polymers such as polyvinyl chloride, organiopolysiloxanes, polymeric methyl acrylate, copolymers of butadiene and styrene, copolymers of butadiene and acrylonitrile, neoprene, polystrene, or natural rubbers can be used.

The diaryl-p-phenylene diamines used as stabilizers can be represented by the general formula

wherein R and R' are phenyl radicals which may be substituted with one or more lower (i.e., up to four carbon atoms) alkyl radicals. Said alkyl radicals preferably contain one or two carbon atoms. The diaryl-p-phenylenediamines are known materials which are available commercially. They can be prepared by reacting 1 mole of hydroquinone with at least 2 moles of an arylamine or a mixture of arylamines. Examples of suitable stabilizers are diphenyl-p-phenylene diamine, di-tolyl-p-phenylenediamine, bis(ethylphenyl)-p-phenylenediamine, and dixylyl-p-phenylenediamines.

Particularly suitable diaryl-p-phenylenediamines are prepared by reacting hydroquinone with a mixture of arylamines containing, for example, equal parts by weight of aniline and o-toluidine or with a mixture of o-toluidine and mixed xylidines. Particularly preferred is the product of U.S. Pat. No. 3,513,124, issued May 19, 1970, to James Kalil. This product is prepared by the condensation of 1 mole of hydroquinone with at least 2 moles of an amine mixture consisting of about 75 to 90 percent by weight of o-toluidine and 25 to 10 percent of an alkylphenylamine mixture which is available commercially as "mixed xylidines." These mixed xylidines consist of differing proportions of xylidine isomers, usually a small amount of ethylaniline, and sometimes trace amounts of other alkylphenylamines. They are prepared by nitration and subsequent reduction of technical xylene. At least about 65 percent by weight of the phenylamine composition contains one or more xylidines from the group consisting of 2,3-, 2,4-, and 2,5-xylidines.

Other suitable condensation products or hydroquinone with arylamine mixtures are enumerated in tables 1 and 2 of British Pat. No. 1,012,945, issued to Goodyear Tire and Rubber Company.

The amount of amine stabilizer used in this invention ranges from 0.25 to 2 parts by weight per 100 parts of polyethylene. At least 0.25 is required to give a significant degree of stabilization and more than 2.0 parts tends to interfere with the cross-linking of the peroxide. A preferred range is 0.5 to 1.5 parts by weight.

A discussion of tertiary peroxides is found in the above-mentioned U.S. Pat. No. 3,296,189 at column 3, line 11 et seq. Any of these can be used in the present invention. Diα-cumyl peroxide is especially suitable, but the others therein disclosed are effective and are incorporated herein by reference. For instance, the tertiary diperoxides having the general structure R—O—O—R' and the particular structures shown below are effective.

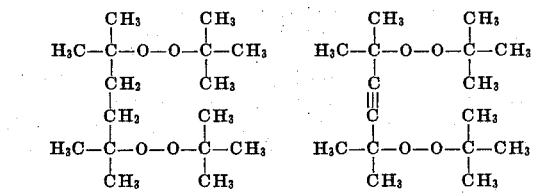

The stabilized polyethylene products are useful for all purposes for which polyethylene has hitherto been employed, such as in the manufacture of molded objects, film, tubing, wire and cable jackets, and the like. They are especially useful where peroxide deterioration of the polymer must absolutely be avoided.

The invention will be better understood by reference to the following illustrative examples.

Example 1

Polyethylene is compounded using the recipe shown in table I employing standard rubber milling procedures at 230° F. (110° C.). After a band of polyethylene has been formed on the mill, the carbon black, antioxidant, and peroxide are added, in that order. The compounded material is removed for the mill and allowed to cool to 70° F. (21° C.). Slabs (4×6× 0.150 inches) inch) are removed from each sample and molded between sheets of polyethylene terephthalate film for 30 minutes in a press heated to 350° F. (177° C.). The finished slabs are 4×6×0.075 inch in size. Dumbbell samples (die "C" size with 0.025 inch-wide necks) are removed and tested at room temperature using an Instron Testing Machine at a head speed of 2 in. per minute using Method ASTM D 412-51T. Additional dumbbell samples are aged in air ovens for the time and temperature shown in table I. These aged samples are allowed to return to room temperature and tested approximately 16 to 24 hours later.

The compounding recipe used is as follows:

|  | Parts by Weight |
|---|---|
| Polyethylene (melt index 2.0, density 0.919, Du Pont "Alathon" 20 polyethylene resin) | 100 |
| Medium thermal carbon black | 3 |
| Dicumyl peroxide (bis($\alpha,\alpha$-dimethylbenzyl) peroxide) added as five parts of a composition containing 40% of the peroxide and 60% calcium carbonate, "DiCup" 40C supplied by Hercules Inc. | 2 |
| Antioxidant (Stabilizer) as in table I | 0.5 |

The following antioxidants are tested as stabilizers: 1A. an N.N'-diaryl-p-phenylenediamine prepared by condensing 1 mole of hydroquinone with 2 moles of a mixture containing 80 percent by weight of o-toluidine and 20 percent mixed xylidines. The powdered product has been mixed with 2 parts of calcium silicate and 3 parts of naphthenic petroleum oil. IB N,N'-diphenyl-p-phenylenediamine.

The results of the tests are shown in Table I. In the table, $T_B$ means tensile strength at break in pounds per square inch and $E_B$ means elongation at break in percent.

TABLE I

| Antioxidant | 1A | 1B | None (Control) |
|---|---|---|---|
| Stress-strain Properties |  |  |  |
| Original |  |  |  |
| $T_B$ | 2,225 | 2,750 | 2,825 |
| $E_B$ | 440 | 450 | 475 |
| After 20 days at 150° C. |  |  |  |
| $T_B$ | 2,450 | 2,275 | 600 |
| $E_B$ | 440 | 395 | 50 |
| Elongation retained, % | 100 | 90 | 10 |
| Appearance after 20 days at 150° C. | Very Good | Distorted Slightly | Flow Marks |

Example 2

Polyethylene (melt index 3.7, density 0.923, Du Pont "alathon" 16 polyethylene resin) is banded on a mill initially heated to 230° F. (110° C.). The temperature of stock rises during milling and allowed to cool back to 240°–250° F. (116°–21° C.) before addition of the antioxidant and the peroxide.

The batch from the mill is processed and tested as in example 1.

The compounding recipes used are as follows:

|  | Parts by Weight |
|---|---|
| Polyethylene | 100 |
| Dicumyl peroxide (added as 96%–99% active ingredient, "Di Cup" R. Hercules, Inc.) | 2 |
| Antioxidant stabilizer | Varied |

The antioxidants tested are as follows:
2A. Same as 1A of example 1.
2B. A diaryl-p-phenylenediamine prepared by condensing 1 mol of hydroquinone with 2 moles of a mixture containing equal parts of aniline and o-toluidine.

Table II shows the results of the tests. $T_B$ and $E_B$ have the same meaning as in table I.

TABLE II

| Antioxidant | 2A | 2A | 2A | 2B | 2B | 2B | None |
|---|---|---|---|---|---|---|---|
| Parts | 0.25 | 0.50 | 2.0 | 0.25 | 0.50 | 2.0 | 0 |
| Stress-strain properties: |  |  |  |  |  |  |  |
| Original: |  |  |  |  |  |  |  |
| $T_B$ | 2,500 | 2,550 | 2,350 | 2,550 | 2,625 | 2,275 | 2,625 |
| $E_B$ | 460 | 470 | 545 | 480 | 525 | 580 | 455 |
| After 20 days at 150° C.: |  |  |  |  |  |  |  |
| $T_B$ | 2,775 | 2,600 | 2,175 | 2,425 | 2,000 | 1,400 | 1,000 |
| $E_B$ | 510 | 520 | 500 | 475 | 425 | 425 | <5 |
| Tensile retained, percent | 100 | 102 | 93 | 95 | 76 | 62 | 38 |
| Elongation retained, percent | 110 | 110 | 92 | 99 | 81 | 74 | 0 |

Example 3

This example is carried out in the same way as example 2 except that the receipt includes 40 parts of Medium Thermal carbon black. The polyethylene and carbon black are mixed in a "B" Banbury mixer at third speed with 150° F. (66° C.) steam on the rotors. The batch is dumped when the temperature of the batch reaches 280° F. (138° C.). This batch is then banded on the mill and processed and tested in the same way as described in example I.

The same antioxidants are tested as in example 2. Table III shows the results of the tests.

TABLE III

| Antioxidant | 2A | 2A | 2A | 2B | None |
|---|---|---|---|---|---|
| Parts | 0.25 | 0.50 | 2.0 | 0.5 | 0 |
| Stress-strain Properties |  |  |  |  |  |
| Original |  |  |  |  |  |
| $T_B$ | 2,500 | 2,375 | 1,950 | 2,250 | 2,600 |
| $E_B$ | 370 | 365 | 355 | 340 | 360 |
| After 10 days at 165° C. |  |  |  |  |  |
| $T_B$ | 1,00 | 1,100 | 1,400 | 1,375 | (a) |
| $E_B$ | 15 | 30 | 80 | 30 |  |
| Tensile retained, % | 40 | 46 | 72 | 61 |  |
| Elongation retained, % | 4 | 8 | 22 | 9 |  |

(a) Too brittle to test

EXAMPLE 4

In this example the following compounding recipe is used:

|  | Parts by Weight |
|---|---|
| Polyethylene (a) | 100 |
| Medium thermal carbon black | 40 |
| 2,5-Dimethyl-2,5-bis(tert-butylperoxy)-3-hexyne (b) | 2.7 |
| Antioxidant (as shown in Table IV) | 0.5 | a. The polyethylene used is a blend consisting of 60 percent of a polyethylene having a melt index of 0.25 and a density of 0.918 and 40 percent of a polyethylene having a melt index of 12.0 and a density of 0.916.

b. The peroxide is added as 6 parts of 45 percent active material on an inert solid filler, supplied as "Luperco" 130-XL by Wallace & Tiernan, Inc.

The polyethylene is compounded on a roll mill at 130° C. and cured in a press at 200° C. for 15 minutes. Stress-strain properties are determined on Microtensile specimens 0.125-inch thick both at 150° C. and at room temperature using an Instron Testing Machine. The head speed used is 2 inches per min. in the 150° C. tests and 20 inches per minute in the room temperature tests. (Microtensile specimens are described in ASTM D-1708-59 T). The antioxidant used is the same as IA in example 1.

The results are shown in table IV.

TABLE IV

| Antioxidant | 1A |
|---|---|
| Stress-Strain Properties (150° C.) | |
| Original | |
| $T_B$ | 169 |
| $E_B$ | 153 |
| After 6 days at 180° C. | |
| $T_B$ | 94 |
| $E_B$ | 128 |
| Tensile retained, % | 55 |
| Elongation retained, % | 84 |
| Stress-Strain Properties (Room Temp.) | |
| Original | |
| $T_B$ | 2,370 |
| $E_B$ | 250 |
| After 6 days at 180° C. | |
| $T_B$ | 1,810 |
| $E_B$ | 125 |
| Tensile retained, % | 76 |
| Elongation retained, % | 50 |

We claim:

1. A curable composition of matter comprising (a) normally solid polyethylene and, per 100 parts by weight of said polyethylene, (b) from 1 to 10 parts by weight of tertiary organic peroxide, and (c) about from 0.25 to 2 parts of a diamine stabilizer prepared by condensing 1 mole of hydroquinone with at least 2 moles of an amine mixture consisting of 75 to 90 percent by weight of o-toluidine and 25 to 10 percent by weight of technical mixed xylidines.

* * * * *